United States Patent [19]
Yoshida et al.

[11] Patent Number: 4,742,245
[45] Date of Patent: May 3, 1988

[54] METHOD FOR CONTROLLING AUTOMATIC DOOR IN TURNING-ON TIME OF ITS POWER SUPPLY

[75] Inventors: Yukio Yoshida, Namerikawa; Akiyoshi Takimoto; Kenzo Ono, both of Toyama; Kiyotada Nishikawa, Kurobe; Toshio Oura, Namerikawa, all of Japan

[73] Assignee: Yoshida Kogyo K. K., Tokyo, Japan

[21] Appl. No.: 942,820

[22] Filed: Dec. 17, 1986

[30] Foreign Application Priority Data

Dec. 28, 1985 [JP] Japan .................................. 60-298250

[51] Int. Cl.⁴ ............................................. E05F 15/14
[52] U.S. Cl. ..................................... 307/119; 307/117
[58] Field of Search ................................ 307/117, 119

[56] References Cited

U.S. PATENT DOCUMENTS 4,401,929  8/1983  Odaka et al. .......................... 318/466
4,408,146 10/1983  Beckerman .......................... 318/466
4,563,625  1/1986  Korn Brekke et al. ............. 318/603

Primary Examiner—Bernard Roskoski
Attorney, Agent, or Firm—Hill, Van Santen, Steadman & Simpson

[57] ABSTRACT

In a method for controlling an automatic door system, after a power-supply switch of the system is turned on, a door of the system initially conducts its low-speed opening/closing operation when a first human-body detection signal is inputted to the system; and then, when the door travels a distance more than a predetermined minimum door stroke, the door conducts its normal-speed opening/closing operation after completion of its traveling the predetermined minimum door stroke to enable the door to conduct its normal-speed operation within a short time after the power-supply switch is turned on.

2 Claims, 5 Drawing Sheets

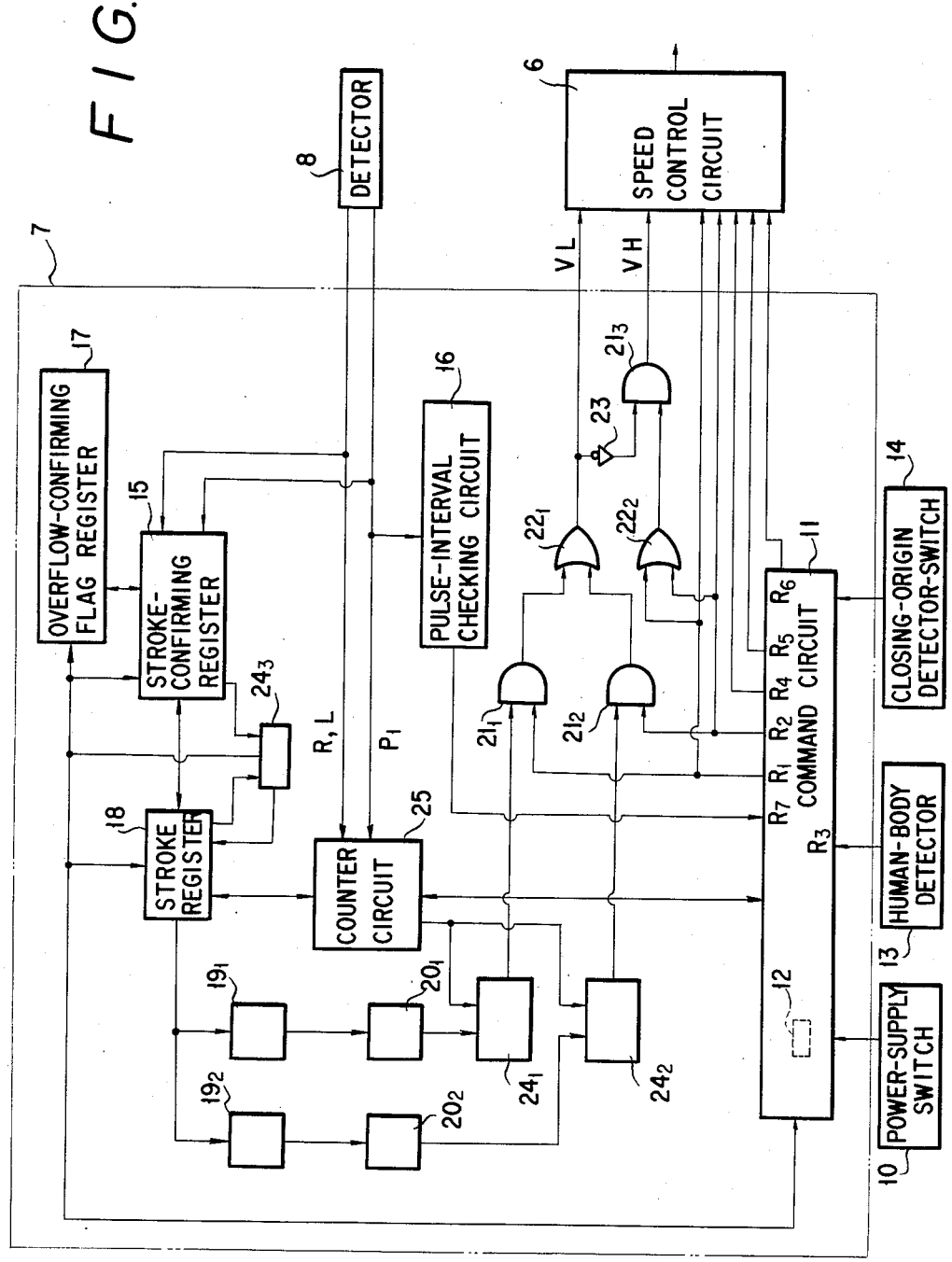

_4,742,245_

METHOD FOR CONTROLLING AUTOMATIC DOOR IN TURNING-ON TIME OF ITS POWER SUPPLY

BACKGROUND OF THE INVENTION

1. Field of the Invention

The present invention relates to a method for controlling an automatic door in a turning-on time of its power supply.

2. Description of the Prior Art

In an automatic door system, a door thereof conducts its opening/closing operation between a stop point thereof in its opening operation (hereinafter referred to as the opening-stop point) and a stop point thereof in its closing operation (hereinafter referred to as the closing-stop point). In the opening with the closing operation the door moves at a high speed until it reaches a deceleration point, followed by a low-speed movement of the door, so that, if the deceleration point is not correctly established, the door collides against the opening-stop point and the closing-stop point.

In order to avoid such such collision, in a conventional automatic door system in which a distance between the opening-stop point and the closing-stop point, i.e., a door stroke, is not recognized, the door conducts its opening/closing operation at a low speed when a power-supply switch thereof is turned on, to determine the door stroke on the basis of which the deceleration points in both the opening operation and the closing operation of the door are established.

A problem to be resolved by the present invention is as follows:

In such conventional method for controlling the automatic door system in a turning-on time of its power-supply switch, after turning on the power-supply switch, the door does not conduct its normal opening/closing operation but repeats its low-speed operation until it is confirmed that the door has reached both the opening-stop point and the closing-stop point, i.e., until the door stroke is determined. Consequently, when a plurality of human-body detection signals are inputted at short-time intervals before the opening-stop point and the closing-stop point are confirmed, the door repeats its low-speed opening/closing operation to enable the door to move to the opening-stop point but prevent the door from moving to the closing-stop point, so that it is not possible to confirm both the opening-stop point and the closing-stop point. As a result, the door can not be returned to its normal opening/closing operation for a long time. This is a problem inherent in the conventional method for controlling the automatic door system.

SUMMARY OF THE INVENTION

It is an object of the present invention to resolve the above problem by providing a method for controlling an automatic door system in a turning-on time of its power-supply switch, wherein the improvement resides in that: after the power-supply switch is turned on, a door (4) of said automatic door system conducts its low-speed opening/closing operation when a first human-body detection signal is inputted to said system., and then, in case that said door (4) travels a door stroke more than a predetermined minimum door stroke in said low-speed opening/closing operation, said door (4) conducts its normal opening/closing operation after completion of its traveling said predetermined minimum door stroke.

Consequently, the method of the present invention enables the door of the automatic door system to return to its normal opening/closing operation in a short time.

DESCRIPTION OF THE PREFERRED EMBODIMENT

Figure 1:
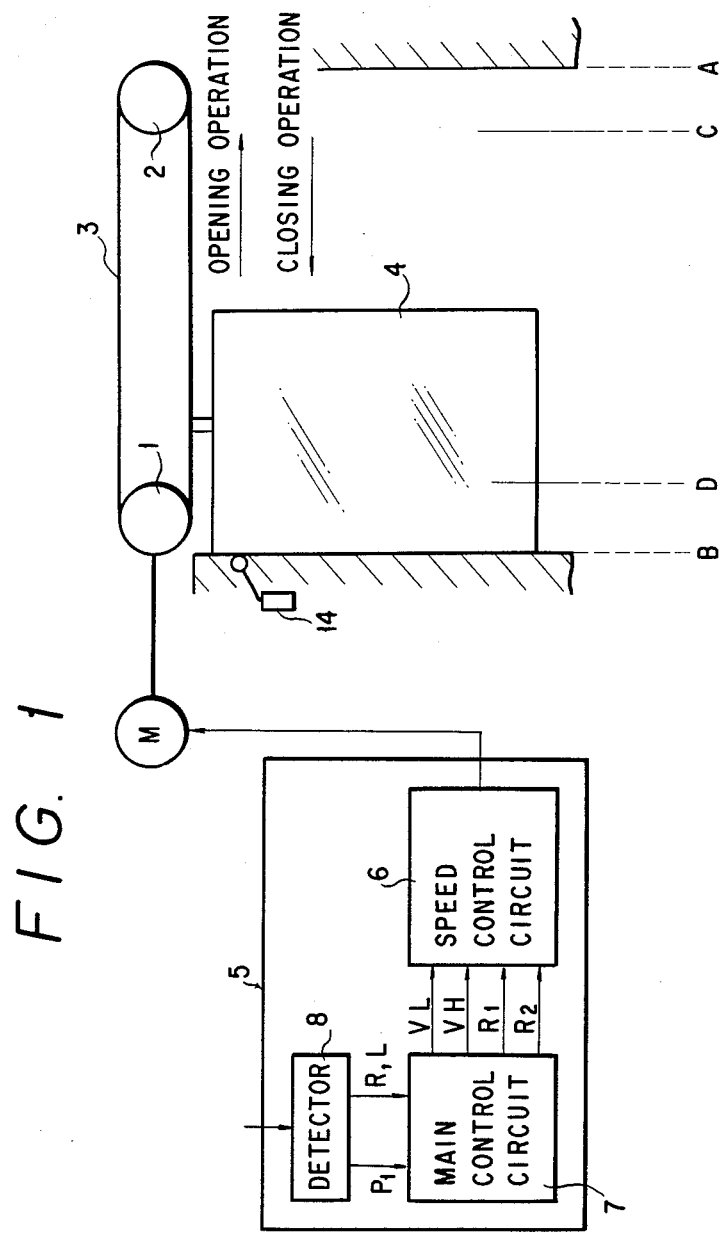
FIG. 1 is a schematic view illustrating the whole automatic door system for working the method of the present invention.

FIG. 1 is a schematic view illustrating the whole automatic door system for working the method of the present invention, in which: a driving pulley 1 is driven by a motor M. A belt 3 is running around the driving pulley 1 and a driven pulley 2, so that when the motor M rotates in its normal direction and reverse direction a door 4 conducts its opening/closing operation between an opening-stop point "A" and a closing-stop point B, and at this time, both a deceleration point C of the door 4 in its opening operation (hereinafter referred to as the opening-deceleration point C) and a deceleration point D of the door 4 in its closing operation (hereinafter referred to as the closing-deceleration point D) are established, and thereafter the door 4 conducts its high-speed opening/closing operation until the door 4 reaches such deceleration points C and D, followed by the low-speed opening/closing operation of the door 4.

The motor M is controlled by a control apparatus 5 which comprises: a main control circuit 7 for issuing to a speed-control circuit 6 of the motor M a normal-direction rotation signal $R_1$, a reverse-direction rotation signal $R_2$, a high-speed signal VH and a low-speed signal VL; and a detector 8 for issuing clock pulses $P_1$ proportional to a traveling stroke of the door 4 for counting use, an opening signal R and a closing signal L both of which are employed for identifying the opening/closing operation of the door 4. Such detector 8 is constructed of a detecting unit and a direction-identification circuit such as those disclosed in Japanese Patent Application Laid-open Specification No. 58-210270.

Hereinbelow, the operation of the door 4 will be described with reference to the block diagram of the control apparatus shown in FIG. 2.

Step (1)

A timer 12 of a command circuit 11 is actuated when a power-supply switch 10 is turned on. After that, in case a human-body detector 13 does not issue a human-body detection signal $R_3$ to the command circuit 11 after a certain period of time, for example, a period of 10 seconds programmed in the timer 12, the command circuit 11 issues to the speed-control circuit 6 a reverse-direction rotation signal and a low-speed signal at a time when the power-supply switch 10 is turned on (hereinafter referred to as the turning-on reverse-direction rotation signal $R_4$ and the turning-on low-speed signal $R_5$, respectively), to cause the motor M to rotate at a low speed in its reverse direction, so that the door 4 conducts its low-speed closing operation.

Step (2)

In case the human-body detection signal R is inputted to the command circuit 11 before the period of time programmed in the timer 12, the command circuit 11 issues a normal rotation signal at a time when the power-supply switch 10 is turned on (hereinafter referred to as the turning-on normal-direction rotation signal $R_6$) and the turning-on low-speed signal $R_5$ to the speed-control circuit 6 to cause the motor M to rotate at a low speed in its normal direction, so that the door 4 conducts its low-speed opening operation.

Step (3)

Figure 3:
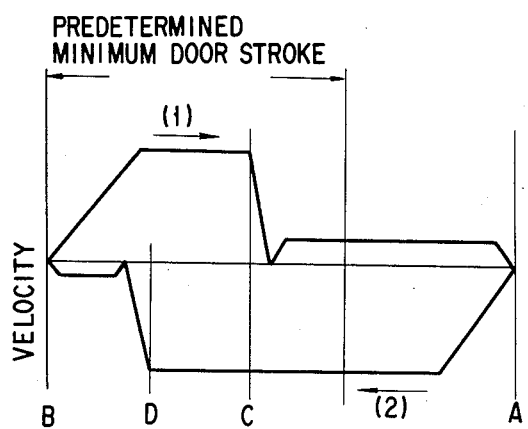
FIGS. 3, 4 and 5 are graphs showing the operations of the door.

In FIG. 1, at a time when a closing-origin detection switch 14 is in its turning-on condition, i.e., at a time when the door 4 stays at the closing-stop point B, as described later, on the basis of the minimum door stroke, both the opening-deceleration point C and the closing-deceleration point D are calculated, and then on the basis of the thus obtained deceleration points C and D, the door 4 conducts its normal opening/closing operation when the humanbody detection signal $R_3$ is inputted to the command circuit 11. A graph of such operation of the door 4 is shown in FIG. 3.

Step (4)

As described in the Step (2), when a body signal is received before the expiration of the period of time programmed in the timer 12, the motor M rotates at a low speed in its normal direction. The command circuit 11 issues a signal to a stroke-confirming register 15 to have the same 15 establish a minimum door stroke therein, which minimum door stroke is subjected to a gradual subtraction by means of the clock pulses $P_1$ issued from the detector 8 during the low-speed opening operation of the door 4. In such low-speed opening operation of the door 4, a pulse-interval checking circuit 16 provided at the output side of the detector 8 detects that the pulse interval of the clock pulses $P_1$ is increased. This signifies that the door 4 reaches the opening-stop point "A" at which the door 4 stops. When the pulse-interval checking circuit 18 detects an increased pulse interval, it emits detection signal $R_7$ which is issued to the command circuit 11 to cause the same 11 to issue a check signal to an overflow-confirming flag register 17, so that it is judged whether or not the contents of the stroke-confirming register 15 are below zero, i.e., whether or not the door 4 travels a distance more than the minimum door stroke in its opening operation. In case that the door 4 travels a distance more that the minimum door stroke in its opening operation, the command circuit 11, to which the flag register 17 issues a confirmation signal, has a stroke register 18 establish the minimum door stroke therein. A minimum door stroke signal is inputted to both an opening-deceleration-point calculating circuit $19_1$ and a closing-deceleration-point calculating circuit $19_2$ to calculate both the opening-deceleration point and the closing-deceleration point signals of which are inputted to an opening-deceleration-point setting unit $20_1$ and a closing-deceleration-point setting unit $20_2$, respectively. At this time, the door 4 conducts, according to the instructions issued from the command circuit 11, its high-speed closing operation until the door 4 reaches the closing-deceleration point, followed by its normal closing operation which continues until the door 4 reaches the closing-stop point B.

Namely, although the command circuit 11 issues the reverse-direction rotation signal $R_1$ to the speed-control circuit 6 and also to a second AND gate $21_2$, since a second comparator $24_2$ does not issue any signal to the second AND gate $21_2$, the second AND gate $21_2$ does not issue any signal. At this time, since a first OR gate $22_1$ does not also issue any signal, an invertor 23 issues a signal to a third AND gate $21_3$ to which is also inputted a signal issued from a second OR gate $22_2$ to cause the third AND gate $21_3$ to issue the high-speed signal VH to the speed-control circuit 6, so that the motor M rotate at a high speed in its reverse direction to have the door 4 conduct its high-speed closing operation.

As a result, the clock pulses $P_1$ issued from the detector 8 are inputted to a counter circuit 25 which is employed to detect a live position of the door 4, and are employed in the gradual subtraction of the minimum door stroke established in the stroke register 18 to produce a resultant signal which is inputted to the second comparator $24_2$ in which the thus produced resultant signal is compared with the signal of the closing-deceleration point established in the closing-deceleration-point setting unit $20_2$. When such resultant signal coincides with the signal of the closing-deceleration point in the second comparator $24_2$, a signal is issued to the second AND gate $21_2$ from the second comparator $24_2$, and in turn the the second AND gate $21_2$ issues a signal to the first OR gate $22_1$ which issues the low-speed signal VL to the speed-control circuit 6 accordingly, to cause the motor M to rotate at a low speed in its reverse direction, so that the door 4 conducts its low-speed closing operation until it reaches the closing-stop point B.

Figure 4:
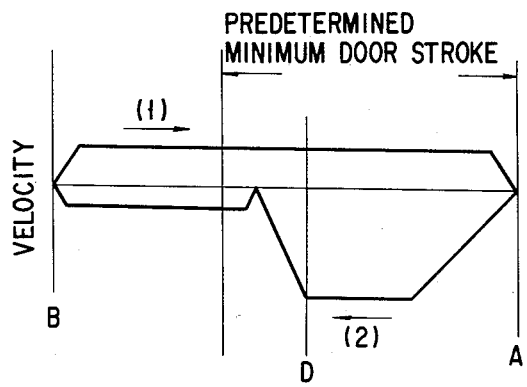

A graph of the above operation is shown in FIG. 4. After the above operation, the door 4 returns to its normal opening/closing operation.

Step (5)

On the other hand, in the step (4), in case that the door 4 does not travel a distance more than the minimum door stroke, for example, in case that the power-supply switch 10 is turned on at a time when the door 4 is open, such condition is detected by the flag register 17 which issues a signal to the command circuit 11 to make the same 11 identify a stop point of the door 4 in its opening operation as the opening-stop point "A" and accordingly make the same 11 reset the counter circuit 18 to zero. At the same time, the contents of the stroke-confirming register 15 are also set to zero according to the instructions issued from the command circuit 11.

Step (6)

When the human-body detection signal $R_3$ disappears, the command circuit 11 issues the turning-on reverse-direction rotation signal $R_4$ and the turning-on low-speed signal $R_5$ to the speed-control circuit 6 to cause the door 4 to conduct its low-speed closing operation.

At this time, the clock pulses $P_1$ issued from the detector 8 are counted up in the stroke-confirming register 15 to determine the closing stroke of the door 4, while the command circuit 11 receives the detection signal $R_7$ issued from the pulse-interval checking circuit 16 to recognize that the door 4 stops at the closing-stop point B, so that the motor is stopped while, according to an instructions issued from the command circuit 11, the contents of the stroke-confirming register 15, i.e., a live stroke of the door 4 is compared in a third comparator $24_3$ with the minimum door stroke established in the stroke register 18. As a result, in case that the contents of the stroke-confirming register 15 are larger than the minimum door stroke, the minimum door stroke is replaced with such contents of the stroke-confirming register 15 in the stroke register 18 so that the opening-deceleration point and the closing-deceleration point are recalculated in the opening-deceleration-point calculating circuit $19_1$ and the closing-deceleration-point calculating circuit $19_2$, respectively, to establish a new opening-deceleration point and a new closing-deceleration point in the opening-deceleration-point setting unit $20_1$ and the closing-deceleration-point setting unit $20_2$, respectively.

Step (7)

After that, when the human-body detection signal $R_3$ is inputted to the command circuit 11, the door 4 conducts its high-speed opening operation until the door 4 reaches the thus established new opening-deceleration point, and then conducts the low-speed opening operation until the door 4 reaches the opening-stop point "A" at which the door 4 stops. After collapse of a predetermined time, the door 4 conducts its normal closing operation as described in the above, and stays at the closing-stop point B until the following human-body detection signal $R_3$ is inputted to the command circuit 11. When the following human-body detection signal $R_3$ is inputted to the command circuit 11, the door 4 conducts its normal opening/closing operation.

Namely, in a condition in which the door 4 stays at the closing-stop point B after completion of the above low-speed closing operation thereof, when the human-body detection signal $R_3$ is inputted to the command circuit 11, the command circuit 11 issues the normal-direction rotation signal $R_1$ to both the speed-control circuit 6 and the first AND gate $21_1$ while the first comparator $24_1$ does not issue any signal to the first AND gate $21_1$, so that, in the same manner as that described in the above, the third AND gate $21_3$ issues the high-speed signal VH to the speed-control circuit 6 to cause the motor M to rotate at a high speed in its normal direction, whereby the door 4 conducts its high-speed opening operation. When the door 4 reaches the opening-deceleration point, the opening-deceleration point coincides with the door position detected by the counter circuit 25 to cause the first comparator $24_1$ to issue a signal to the first AND gate $21_1$, so that, in the same manner as that described in the above, the first OR gate $22_1$ issues the low-speed signal VL to the speed-control circuit 6, whereby the motor M rotates at a low speed in its normal direction to cause the door 4 to conduct its low-speed opening operation.

Figure 5:
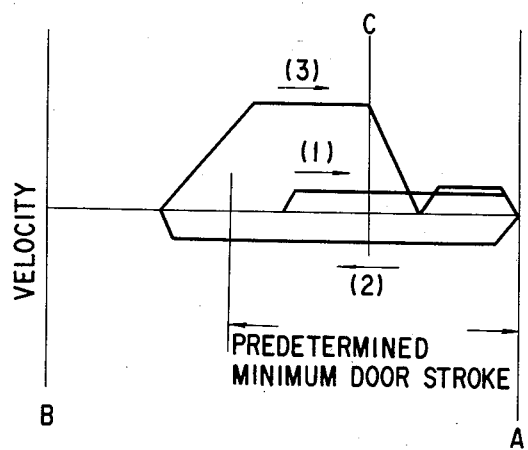

A graph of the above operation is shown in FIG. 5.

Step (8)

In the low-speed closing operation of the door 4 described in the Step (6), when the human-body detection signal $R_3$ is inputted to the command circuit 11 before the command circuit 11 receives the detection signal $R_7$ issued from the pulse-interval checking circuit 16, the contents of the stroke-confirming register 15 are compared in the third comparator $24_3$ with the contents of the stroke register 18. As a result, when the contents of the stroke-confirming register 15 are larger than those of the stroke register 18, the contents of the stroke register 18 are replaced with those of the stroke-confirming register 15 as described above, while the opening-deceleration point and the closing-deceleration point are recalculated to produce a new opening-deceleration point and a new closing-deceleration point which are established in the opening-deceleration-point setting unit $20_1$ and the closing-deceleration-point setting unit $20_2$, respectively, on the basis of which new deceleration points, the door 4 conducts its normal opening/closing operation as described above.

Figures 1, 6:
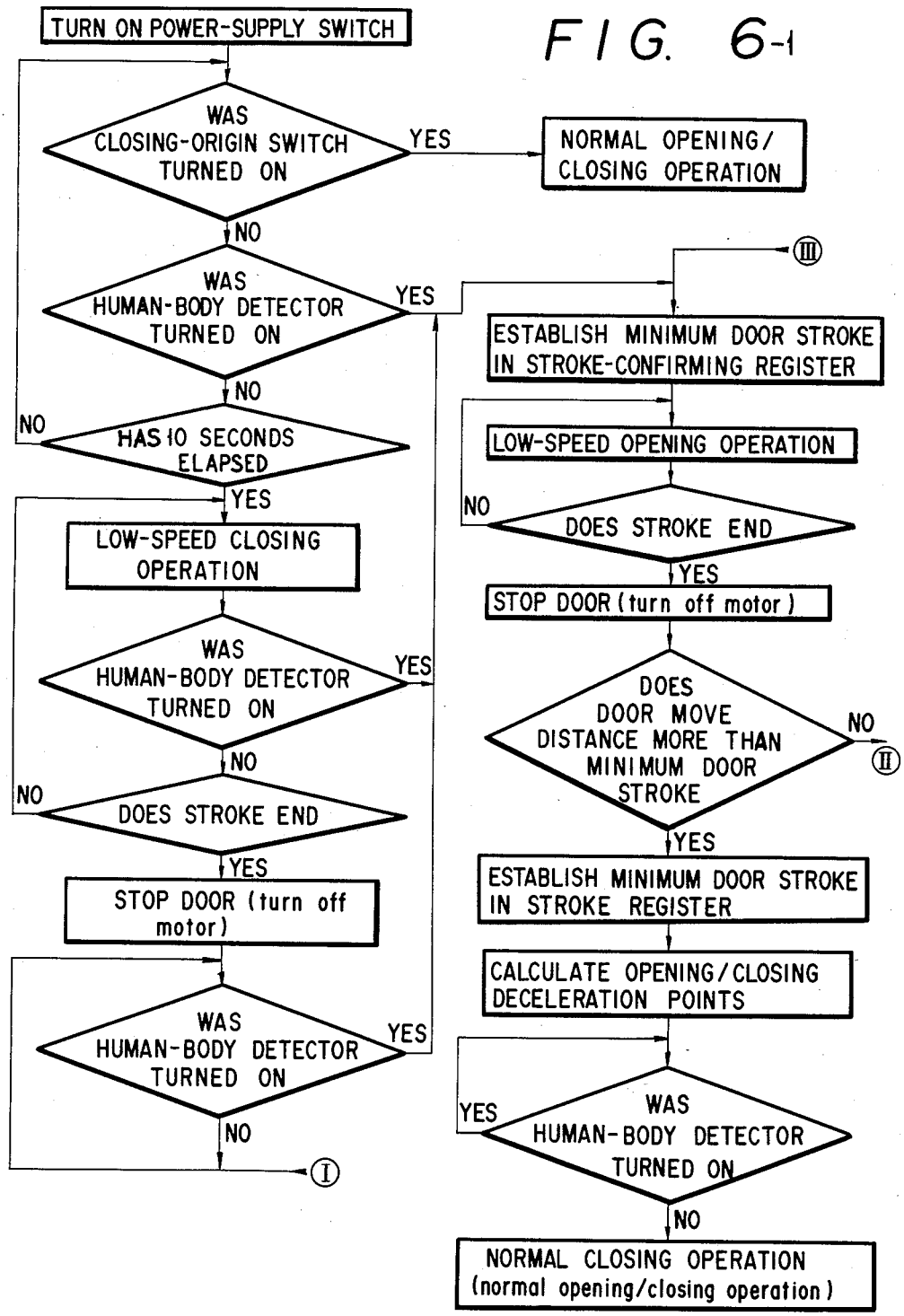
FIG. 6 is flowchart showing the operation of the automatic door system for working the method of the present invention.
Figures 2, 6:
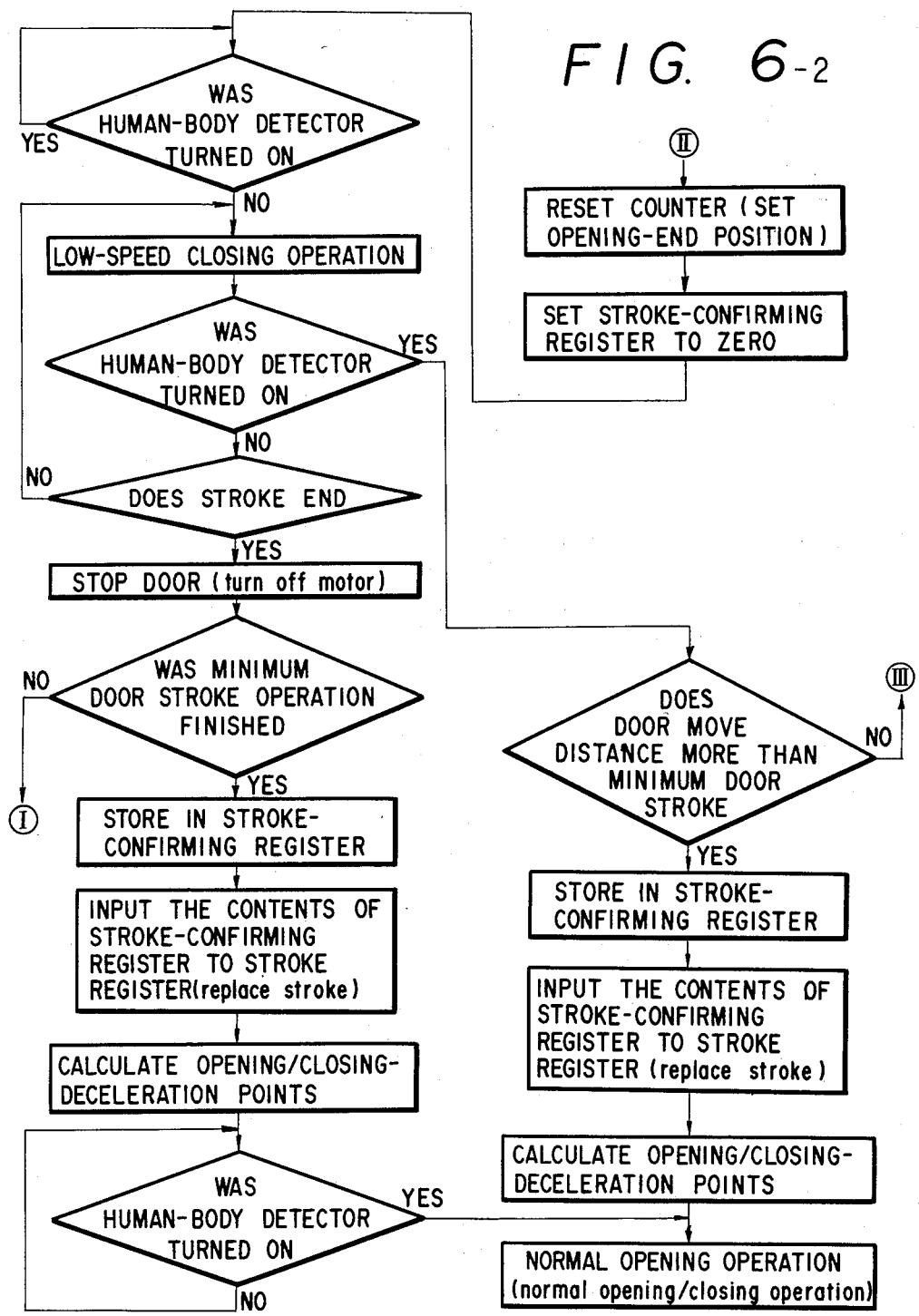
FIG. 2 is a block diagram illustrating a control apparatus employed in the automatic door system for working the method of the present invention.

A flowchart of the above operation is shown in FIG. 6.

The effect of the present invention resides in the following:

In case that the door 4 travels a distance more than the minimum door stroke in its opening operation or closing operation at a time when the power-supply switch 10 is turned on, the door 4 can conduct its following normal opening/closing operatin to make it unnecessary to confirm both the opening-stop point and the closing-stop point in contrast with the conventional method. In addition, even when a plurality of the human-body detection signals $R_3$ are inputted to the command circuit 11 at short-time intervals after the power-supply switch 10 is turned on, it is possible that the door 4 conducts its normal opening/closing operation after a first human-body detection signal $R_3$ is inputted to the command circuit 11. Consequently, the method of the present invention enables the door 4 to conduct its normal opening/closing operation within a short time after the power-supply switch 10 is turned on. This is the effect of the method of the present invention.

What is claimed is:

1. A method for controlling an automatic door system comprising the steps of:
   moving a door of said automatic door system at a low speed when a first human body detection signal is input to said automatic door system after a power supply swich is turned on, and
   moving said door of said automatic door system at a normal operation after said door has traveled a predetermined minimum door stroke at said low speed so that said door travels more than said predetermined minimum door stroke.

2. A method for controlling a door in an automatic door system including a body detector, comprising:
   establishing a first time period upon turning on a power switch for the automatic door system;
   conducting a low-speed closing of the door after said first time period if a body detection signal is not received;
   establishing a minimum door stroke during said low speed opening;
   calculating an opening deceleration point and a closing deceleration point from said low speed opening;
   conducting a low-speed opening of the door if a body detection signal is received;
   determining whether the door has traveled more than said minimum door stroke during said low speed opening;
   calculating the opening deceleration point and the closing deceleration point from a minimum door stroke signal if the door is determined to have traveled more than said minimum door stroke;
   identifying an opening stop point if the door is determined to have not traveled more than the minimum door stroke;

conducting a low speed closing of the door after identifying the opening stop point;
establishing an actual stroke length from said low speed closing;
calculating an opening deceleration point and a closing deceleration point from said actual stroke length of said low speed closing; and
conducting normal opening and closing of the door upon receiving a body detection signal, said normal opening and closing of the door including high speed opening and closing of the door until the door reaches the respectivel opening deceleration point and closing deceleration point at which time a low speed respective opening and closing is performed.

* * * * *